United States Patent [19]
Fink

[11] Patent Number: 6,023,153
[45] Date of Patent: Feb. 8, 2000

[54] AUDIO AMPLIFIER HAVING POWER FACTOR CORRECTION

[75] Inventor: Dennis Fink, Warwick, N.Y.

[73] Assignee: Crest Audio, Inc., Paramus, N.J.

[21] Appl. No.: 09/151,140

[22] Filed: Sep. 10, 1998

Related U.S. Application Data

[60] Provisional application No. 60/059,591, Sep. 23, 1997.

[51] Int. Cl.$^7$ ...................................................... G05F 1/70
[52] U.S. Cl. ............................................. 323/210; 323/222
[58] Field of Search ..................................... 323/209, 210, 323/222; 363/15, 16

[56] References Cited

U.S. PATENT DOCUMENTS

| | | | |
|---|---|---|---|
| 3,992,585 | 11/1976 | Turner et al. | 381/110 |
| 4,346,374 | 8/1982 | Groff | 340/573 |
| 4,500,879 | 2/1985 | Smith, III et al. | 345/16 |
| 4,717,889 | 1/1988 | Engelmann | 330/297 |
| 5,461,303 | 10/1995 | Leman et al. | |
| 5,502,630 | 3/1996 | Rokhvarg . | |
| 5,614,810 | 3/1997 | Nostwick et al. . | |
| 5,637,988 | 6/1997 | Gucyski . | |

*Primary Examiner*—Adolf Deneke Berhane
*Attorney, Agent, or Firm*—Ostrolenk, Faber, Gerb & Soffen, LLP

[57] ABSTRACT

An audio amplifier for receiving input current and sinusoidal line voltage from an AC source, and delivering audio output power to a load includes: a power factor correction circuit for receiving the line voltage from the AC source, the power factor correction circuit including a control circuit operable to cause the wave shape of the input current drawn from the AC source to substantially correspond to the wave shape of the line voltage by producing an intermediate source of voltage at a substantially higher potential than the line voltage of the AC source; a DC power supply coupled to the power factor correction circuit and operable to convert the intermediate source of voltage into a regulated DC source of power; and an audio power amplifier coupled to the DC power supply and operable to convert the DC source of power into the audio output power for delivery to the load.

22 Claims, 4 Drawing Sheets

AUDIO AMPLIFIER HAVING POWER FACTOR CORRECTION

CROSS REFERENCE TO RELATED APPLICATION

This application is based on and claims priority to United States Provisional Patent Application No. 60/059,591, filed Sep. 23, 1997, entitled AUDIO AMPLIFIER HAVING POWER FACTOR CORRECTION.

BACKGROUND OF THE INVENTION

1. Field of the Invention

The present invention relates to audio amplifier circuits and, more particularly, to audio amplifier circuits employing power factor correction circuitry to improve the current draw characteristics from an AC line.

2. Related Art

With reference to FIGS. 1 and 2, two conventional audio amplifiers are shown. The audio amplifier of FIG. 1 includes terminals for connection to an AC line 12, a linear amplifier 10, and a power amplifier 20. The power amplifier 20 is connected to a speaker 22 as is known in the art.

The linear power supply 10 includes an AC line transformer 14, for example a 60 Hz, 120 V step down transformer, a rectifier 16 (for example, a full bridge rectifier) and a filter capacitor 18. The linear power supply operates to convert the AC power from the AC line 12 to DC power across filter capacitor 18 for connection to the power amplifier 20. The power amplifier 20 converts the low power signal input to the power amplifier 20 to a high power signal for delivery to the speaker 22.

The audio amplifier of FIG. 1 suffers from several disadvantages. In particular, the AC line transformer 14 is typically very large and heavy due to the relatively low frequency of the AC line. Further, the filter capacitor 18 must have a relatively high value of capacitance which may require multiple capacitors, again because of the low frequency of the AC line 12.

Moreover, the input current drawn by the linear power supply 10 from the AC line 12 is not ideal. Indeed, with reference to FIG. 5 it is noted that the current I flowing from the AC line 12 into the linear power supply 10 has a relatively high peak current as compared to the voltage waveform of the AC line. Indeed, the current I does not substantially correspond to the wave shape of the voltage on the AC line 12 and, therefore, creates distortion on the AC line 12. This distortion is very undesirable because it creates harmonics on the AC line 12.

Further, the audio amplifier of FIG. 1 suffers from the additional disadvantage that the maximum power deliverable from the linear power supply 10 to the power amplifier 20 reduces as the voltage on the AC line 12 reduces. As may be seen in FIG. 3, as the AC line voltage reduces from 120 volts to 65 volts the loss percentage of the power deliverable from the linear power supply 10 moves from the ideal value of 1.00 towards about 0.30. As a result, the maximum power delivered to the speaker 22 is a function of the voltage on the AC line 12. This is severely problematic when the audio amplifier is connected to AC lines 12 having lower voltage levels or varying levels.

The audio amplifier of FIG. 2 includes terminals for connection to the AC line 12, a switching power supply 11, and a power amplifier 20. The power amplifier 20 is coupled to a speaker 22 as is known in the art. The switching power supply 11 includes an input rectifier 13 coupled to the AC line 12, a filter capacitor 17, a switch 24, a high frequency transformer 15, a rectifier 16, and a filter capacitor 18'. The input rectifier 13, for example, a full bridge rectifier, in combination with the filter capacitor 17 produces a rough source of DC power from the AC line 12. The switch 24, which may be implemented using a semiconductor transistor or the like, is coupled in series with the primary of the high frequency transformer 15 so that a voltage is produced on the secondary winding of the transformer which has desirable characteristics.

Typically, there is a closed loop control system which senses the voltage on the secondary of the high frequency transformer 15 and uses the sensed voltage to control the switch. 24 More particularly, the switch 24 is controlled to produce a pulse width modulated signal on the secondary winding of the transformer 15. As is known in the art, the switch 24 is turned on and off at a relatively high frequency (for example, 70 KHz) as compared to the frequency of the voltage on the AC line 12 such that very efficient conversion of the DC voltage level across filter capacitor 17 to a lower DC voltage across filter capacitor 18' is obtained. Rectifier 16 in combination with filter capacitor 18' produce a smooth DC voltage level for input to the power amplifier 20. The power amplifier 20 converts the low power signal input thereto to a high power signal for delivery to the speaker 22.

The audio amplifier of FIG. 2 overcomes some of disadvantages of the circuit shown in FIG. 1. Namely, the circuit of FIG. 2 requires a relatively smaller transformer 15 as compared to the AC line transformer 14 of FIG. 1 because the frequency of operation of the transformer 15 is much higher than the frequency of the AC line 12. Further, capacitors 17 and 18' may be much smaller in capacitance than capacitor 18 of the linear power supply 10, again because the frequency of operation of the switch 24 and transformer 15 are much higher than the frequency of the AC line 12.

The audio amplifier of FIG. 2, however, still suffers from several disadvantages. Namely, as was the case with the circuit of FIG. 1, the power supply 11 draws current I from the AC line 12 having relatively high peak values as is shown in FIG. 5. In addition, the maximum power deliverable from the switching power supply 11 to the power amplifier 20 drops as a function of the voltage level of the AC line 12. Consequently, when the circuit of FIG. 2 is utilized in a country having a standard AC line 12 of, for example, 100 volts, the maximum power deliverable from the power amplifier 20 to the speaker 22 drops substantially (see FIG. 3).

Accordingly, there is a need in the art for an audio amplifier system which is capable of drawing current from the AC line which closely follows the wave shape of the voltage on the AC line and is capable of delivering a relatively constant maximum power level to the speaker 22 which is in variable as a function of either the frequency or the voltage level of the AC line 12.

SUMMARY OF THE INVENTION

In order to overcome the disadvantages of the prior art, the audio amplifier of the instant invention receives input current and sinusoidal line voltage from an AC source, and delivers audio output power to a load, the amplifier includes: a power factor correction circuit for receiving the line voltage from the AC source, the power factor correction circuit including a control circuit operable to cause the wave shape of the input current drawn from the AC source to substantially correspond to the wave shape of the line voltage by producing an intermediate source of voltage at a substantially higher potential than the line voltage of the AC source; a DC power supply coupled to the power factor correction circuit and operable to convert the intermediate source of voltage into a regulated DC source of power; and an audio power amplifier coupled to the DC power supply and operable to convert the DC source of power into the audio output power for delivery to the load.

BRIEF DESCRIPTION OF THE DRAWING

For the purpose of illustrating the invention, there is shown in the drawing a form which is presently preferred, it being understood, however, that the invention is not limited to the precise arrangement and instrumentality shown.

DETAILED DESCRIPTION OF THE PREFERRED EMBODIMENT

Figure 4:
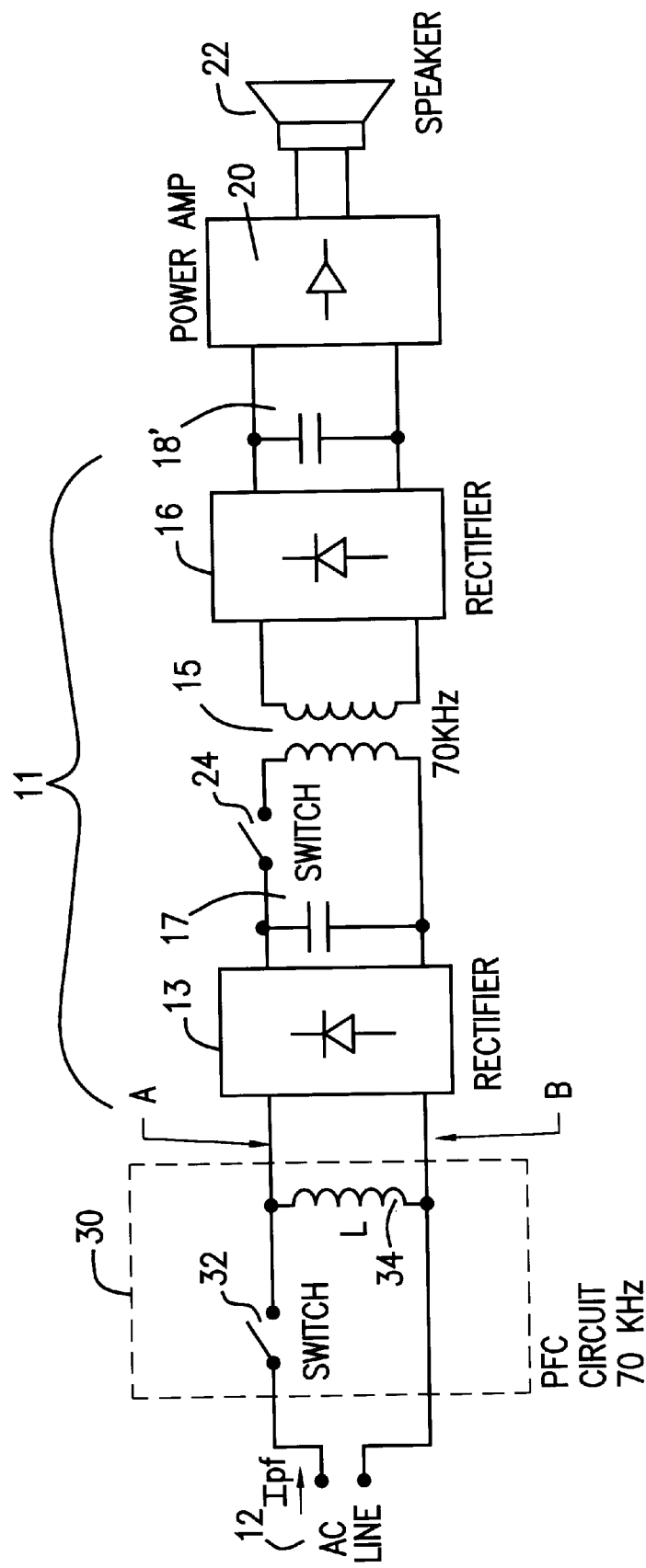
FIG. 4 is a schematic diagram showing an audio amplifier circuit employing a switching power supply and a power factor correction circuit according to the present invention.

Referring now to the drawings wherein like numerals indicate like elements, there is shown in FIG. 4 a novel audio amplifier in accordance with the present invention. The audio amplifier includes terminals for connection to the AC line 12, a power factor correction circuit 30, a switching power supply 11, and a power amplifier 20.

It is preferred that the switching power supply 11 be a resonant switching power supply, the details of which are known in the art.

An important feature of the instant invention is the use of the power factor correction circuit 30 in combination with the power supply 11 in an audio amplifier. The power factor correction circuit 30 includes a switch 32 shown generally as a signal pole signal throw switch, it being understood that the switch 32 may be implemented using one or more active devices, such as bipolar transistors, MOSFET transistors, or the like. The power factor correction circuit 30 also includes an inductor L (34) coupled in a shunt configuration across nodes A and B.

It is understood that the switch 32 and inductor 34 are arranged in a boost configuration and that the power factor correction circuit 30 operates in a manner well known in the art for providing power factor correction of an AC line. See for example, U.S. Pat. Nos.: 5,461,303, 5,502,630, 5,614, 810, and 5,637,988, the entire disclosures of which are hereby incorporated by reference.

Figure 2:
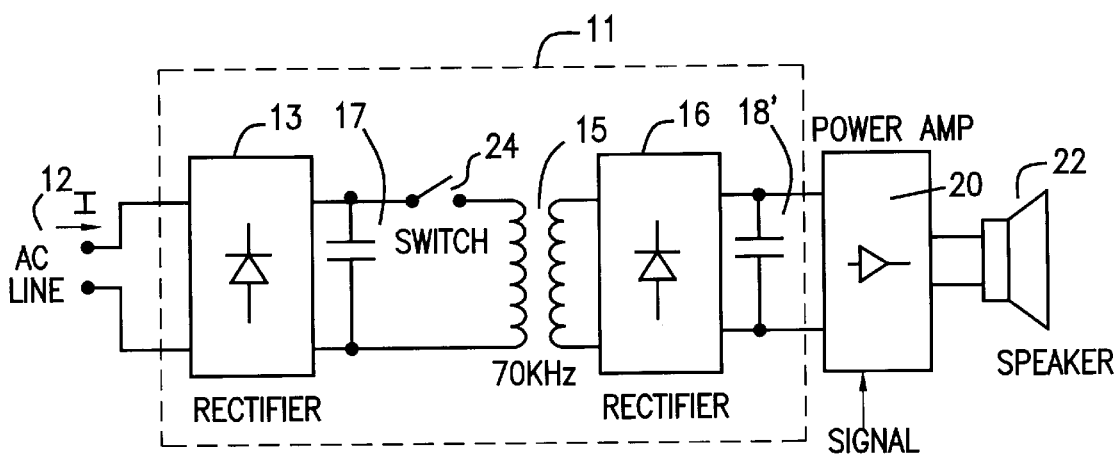
FIG. 2 is a schematic diagram showing an audio amplifier circuit employing a switching power supply according to the prior art.
Figure 3:
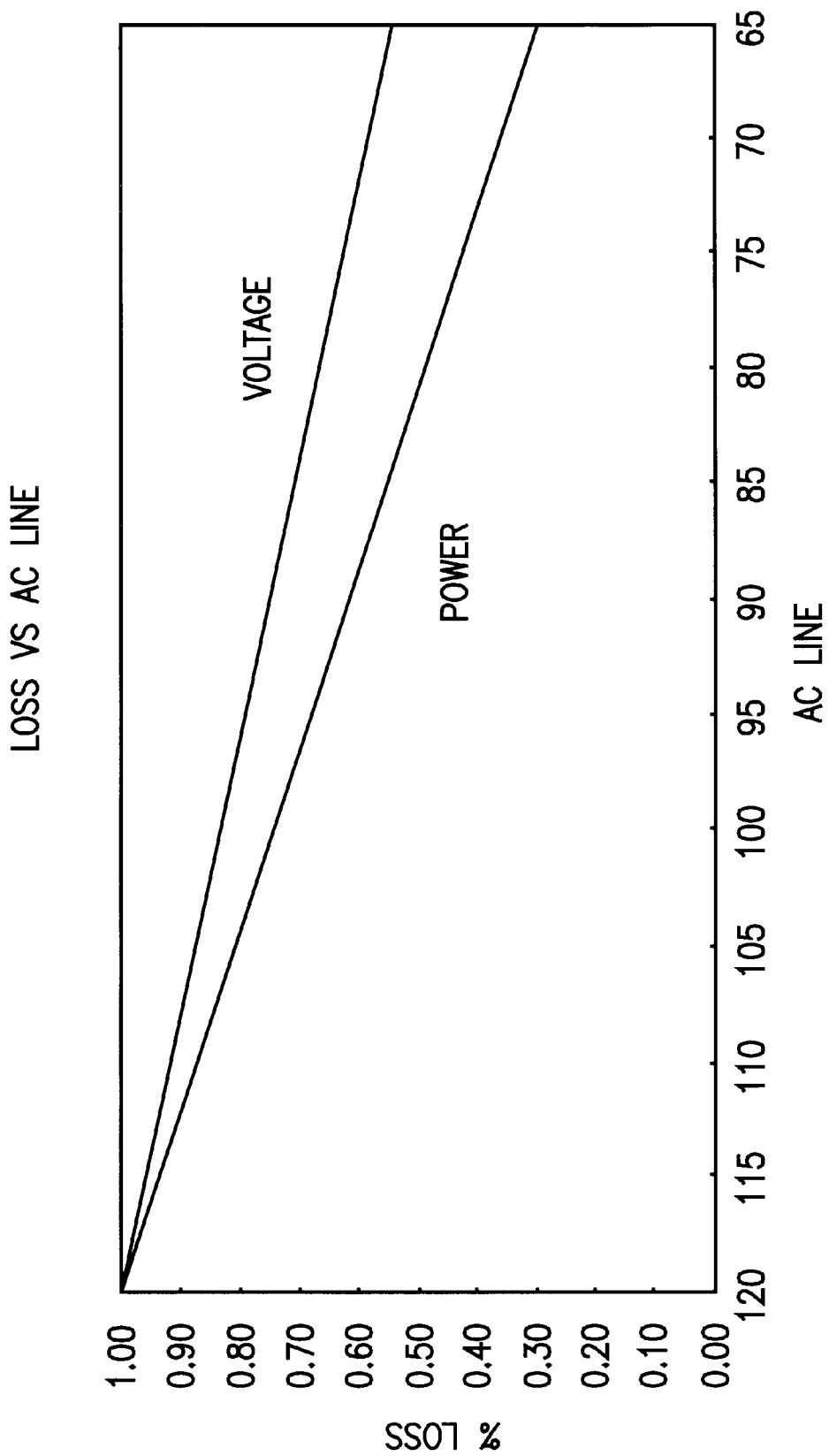
FIG. 3 is a graphical chart showing the relationship between line voltage and deliverable power from the audio amplifier circuits of FIGS. 1 and 2.

The power factor correction circuit is adapted to drawn current Ipf from the AC line 12 during periods when current would not otherwise be drawn by the switching power supply 11 alone (as in FIG. 2). This is accomplished by boosting the line voltage from the AC source 12 to a higher voltage between nodes A and B, thereby forcing current to be drawn by the power supply 11. Thus, the power factor correction circuit 30 is adapted to deliver current to the switching power supply 11 such that a lower amount of peak current is drawn from the AC line 12.

Figure 5:
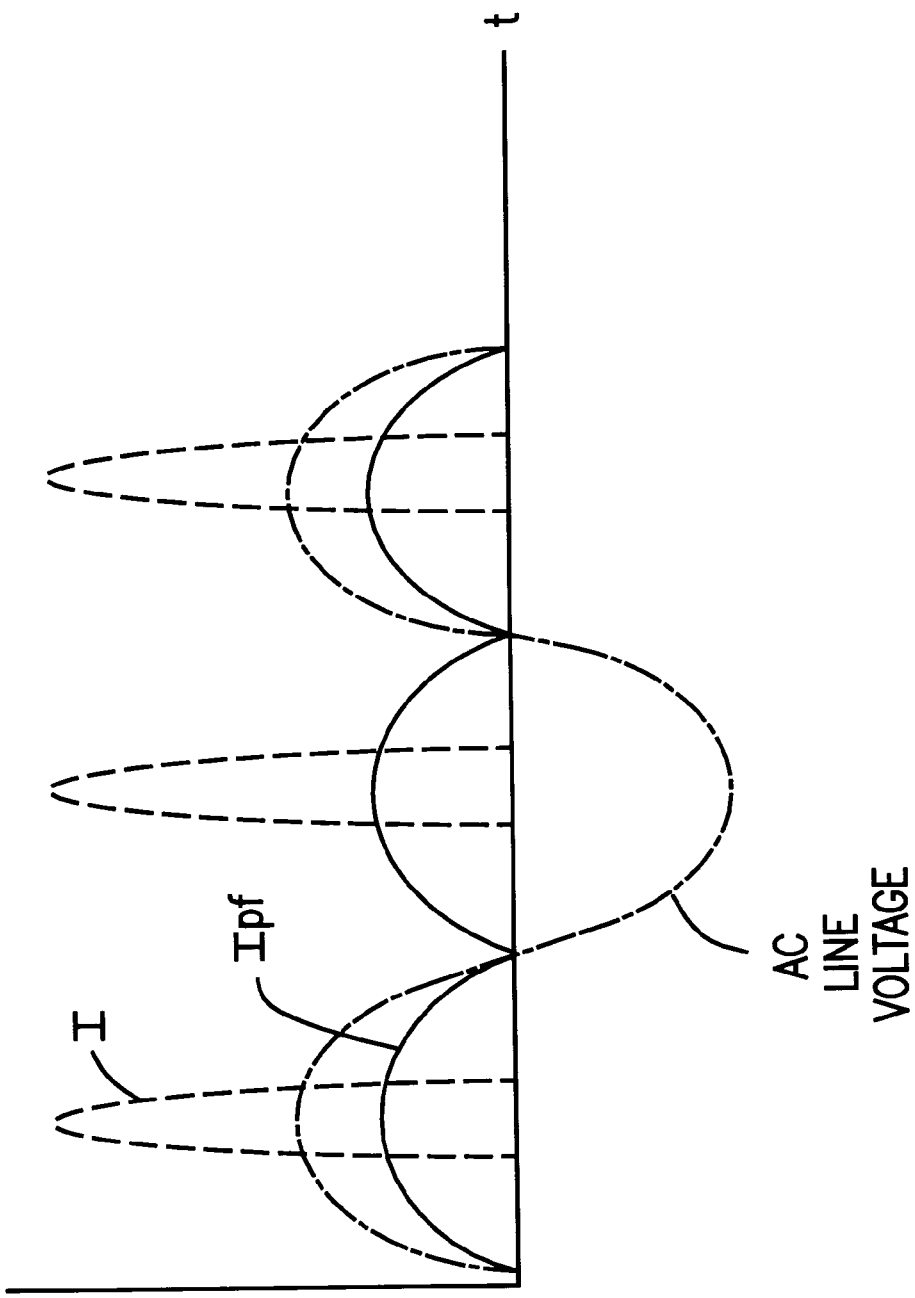
FIG. 5 is a graphical chart showing the relationship between line voltage and input current waveforms of the audio amplifier circuits of FIGS. 1, 2, and 4.

The power factor correction circuit 30 includes a control circuit (preferably a closed loop control, not shown) which is adapted to turn on and off the switch 32 at a relatively high frequency (for example 70 KHz) as compared to the frequency on the AC line 12 such that the wave shape of the average current Ipf drawn into the power factor correction circuit 30 closely follows the wave shape of the voltage across the AC line 12 (see FIG. 5).

Consequently, the power deliverable from the power supply 11 to the power amplifier 20 is invariant as a function of the voltage level on the AC line 12. Further, the power deliverable from the switching power supply 11 to the power amplifier 20 is insensitive to the frequency of the AC line 12. Thus, the power amplifier 20 may deliver a relatively constant amount of peak power to the speaker 22 irrespective of the particular voltage and frequency characteristics of the AC line 12.

Figure 1:
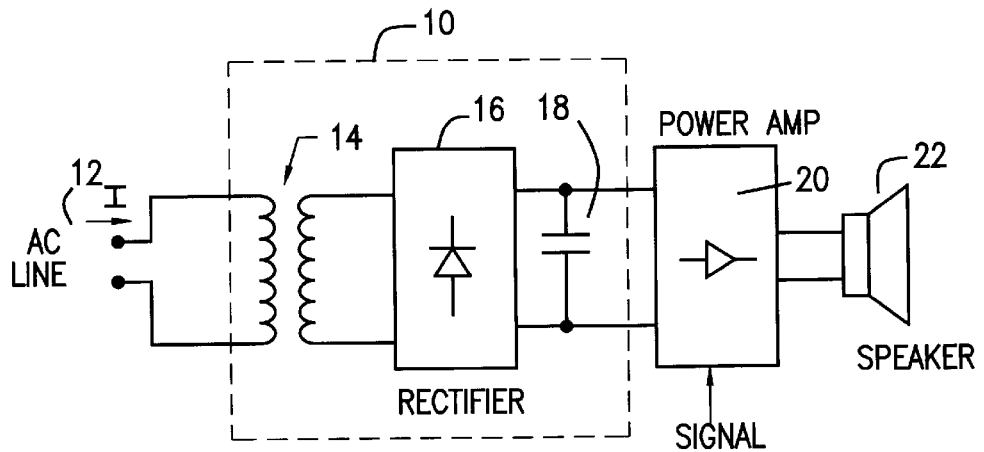
FIG. 1 is a schematic diagram showing an audio amplifier circuit employing a linear power supply according to the prior art.

The use of the power factor correction circuit 30 in combination with the switching power supply 11 and power amplifier 20 has the following advantages:

the peak values of the input current Ipf drawn from the AC line 12 are significantly reduced, thereby (i) reducing $I^2R$ losses and reducing the current carrying requirements of certain components (e.g., power distribution components) in the system, and (ii) dramatically reducing the net weight of the audio amplifier as compared to conventional audio amplifiers;

the lower peak currents Ipf drawn by the audio amplifier enable use of lower-rated breakers than the relatively high power delivered to the speaker 22 would permit as compared to conventional audio amplifier systems;

the wave shape of the current Ipf drawn from the AC line 12 closely follows the voltage wave shape of the AC line 12, thereby reducing harmonics (i.e., distortion) on the AC line and ensuring that the input impedance of the audio amplifier has a resistive characteristic as viewed from the AC source;

the sinusoidal input current Ipf of the present invention has a substantially reduced RMS value as compared to the input current I of conventional amplifiers and, therefore, ensures maximum power transfer from the AC line 12 to the audio amplifier;

the maximum power deliverable from the power amplifier 20 to the speaker 22 is relatively constant irrespective of both the voltage level and frequency of the AC line 12, thereby (i) reducing supply voltage ripple, (ii) permitting use of longer power cables from the AC line source to the audio amplifier than would be permitted by conventional amplifiers, and (iii) eliminating the need for costly equipment necessary to convert the voltage and frequency characteristics of the AC line 12 to an ideal (test results of a model of the present invention revealed consistent levels of delivered power with line voltages ranging from about 90–130 VAC @ 50–60 Hz and 180–255 VAC @ 50–60 Hz); and the power factor correction circuit 30 produces a much higher DC voltage across storage capacitor 17 (for example, about 400–500 volts) as compared to the voltage on capacitor 18 of FIG. 1 (i.e., less than about 200 V) and the voltage on capacitor 17 of FIG. 2 (i.e., about 200 V), thus the transient response of the power amplifier 20 (i.e., the response to kick drums, base guitar or the like) is greatly improved because the energy available for transients is proportional to ½ $CV^2$.

The foregoing description of the present invention has been provided for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An audio amplifier for receiving input current and sinusoidal line voltage from an AC source, and delivering audio output power to a load, the audio amplifier comprising:

a power factor correction circuit for receiving the line voltage from the AC source, the power factor correction circuit including a control circuit operable to cause the wave shape of the input current drawn from the AC source to substantially correspond to the wave shape of the line voltage by producing an intermediate source of voltage at a substantially higher potential than the line voltage of the AC source;

a DC power supply coupled to the power factor correction circuit and operable to convert the intermediate source of voltage into a regulated DC source of power; and an audio power amplifier coupled to the DC power supply and operable to convert the DC source of power into the audio output power for delivery to the load.

2. The audio amplifier of claim 1, wherein the power factor correction circuit includes at least one switching transistor and inductor configured in a boost arrangement, the control circuit adjusting a duty cycle of the transistor by biasing the transistor on and off at a frequency substantially greater than the frequency of the AC source such that the intermediate source of voltage has peak voltages which are substantially higher than peak voltages of the AC source.

3. The audio amplifier of claim 2, wherein the control circuit biases the transistor on and off at a frequency of about 70 KHz.

4. The audio amplifier of claim 2, wherein the control circuit controls the duty cycle of the transistor such that the peak voltage of the intermediate source of voltage is about 400–500 volts.

5. The audio amplifier of claim 1, wherein the power factor correction circuit or the DC power supply includes a rectifier and a storage capacitor coupled to the intermediate source of voltage such that a preliminary DC source of power is available across the storage capacitor, the DC power supply converting the preliminary source of DC power into the regulated DC source of power.

6. The audio amplifier of claim 5, wherein the DC power supply is a switching power supply.

7. The audio amplifier of claim 6, wherein the DC power supply is a resonant switching power supply.

8. The audio amplifier of claim 5, wherein the preliminary DC source of power has a voltage of about 400–500 volts.

9. An audio amplifier for receiving input current and sinusoidal line voltage from an AC source, and delivering audio output power to a load, the audio amplifier comprising:

a power factor correction circuit for receiving the line voltage from the AC source and controlling the phase of the input current drawn from the AC source to substantially correspond to the phase of the line voltage, the power factor correction circuit producing an intermediate source of voltage;

a DC power supply coupled to the power factor correction circuit and operable to convert the intermediate source of voltage into a regulated DC source of power; and an audio power amplifier coupled to the DC power supply and operable to convert the DC source of power into the audio output power for delivery to the load.

10. The audio amplifier of claim 9, wherein the power factor correction circuit includes a control circuit, at least one switching transistor, and an inductor configured in a boost arrangement, the control circuit operating to minimize harmonic distortion at the AC source.

11. The audio amplifier of claim 9, wherein the power factor correction circuit includes a control circuit operating to minimize the root-mean-square (RMS) value of the input current drawn from the AC source.

12. The audio amplifier of claim 9, wherein the power factor correction circuit includes a control circuit operating to maximize power transfer characteristics from the AC source to the load.

13. The audio amplifier of claim 9, wherein the power factor correction circuit includes a control circuit operating to maintain the maximized power transfer characteristics from the AC source to the load at a substantially constant level irrespective of variations in RMS voltage and frequency of the AC source.

14. The audio amplifier of claim 13, wherein the power factor correction circuit operates to maintain power transfer characteristics from the AC source to the load at a substantially constant level despite RMS voltage variations of about 20% at the AC source.

15. The audio amplifier of claim 13, wherein the power factor correction circuit operates to maintain power transfer characteristics from the AC source to the load at a substantially constant level despite that the frequency of the AC source varies from about 50 to 60 Hz.

16. The audio amplifier of claim 9, wherein the power factor correction circuit includes at least one switching transistor and inductor configured in a boost arrangement, the control circuit adjusting a duty cycle of the transistor by biasing the transistor on and off at a frequency substantially greater than the frequency of the AC source such that the intermediate source of voltage has peak voltages which are substantially higher than peak voltages of the AC source.

17. The audio amplifier of claim 16, wherein the control circuit biases the transistor on and off at a frequency of about 70 KHz.

18. The audio amplifier of claim 16, wherein the control circuit controls the duty cycle of the transistor such that the peak voltage of the intermediate source of voltage is about 400–500 volts.

19. The audio amplifier of claim 9, wherein the power factor correction circuit or the DC power supply includes a rectifier and a storage capacitor coupled to the intermediate source of voltage such that a preliminary DC source of power is available across the storage capacitor, the DC power supply converting the preliminary source of DC power into the regulated DC source of power.

20. The audio amplifier of claim 19, wherein the DC power supply is a switching power supply.

21. The audio amplifier of claim 20, wherein the DC power supply is a resonant switching power supply.

22. The audio amplifier of claim 19, wherein the preliminary DC source of power has a voltage of about 400–500 volts.

* * * * *

UNITED STATES PATENT AND TRADEMARK OFFICE
Certificate

Patent No. 6,023,153                                                                   Patented: February 8, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Francis D. Batcheler, Somerville, NJ; and Dietz Gengelbach, Meridian, Mississippi.

Signed and Sealed this Third Day of August 2004.

MICHAEL J. SHERRY
*Supervisory Patent Examiner*
*Art Unit 2838*